US009680794B2

(12) United States Patent
Curry et al.

(10) Patent No.: US 9,680,794 B2
(45) Date of Patent: Jun. 13, 2017

(54) SECURE ONE-WAY INTERFACE FOR ARCHESTRA DATA TRANSFER

(71) Applicant: Owl Computing Technologies, LLC, Ridgefield, CT (US)

(72) Inventors: John Curry, New River, AZ (US); Ronald Mraz, South Salem, NY (US)

(73) Assignee: Owl Computing Technologies, LLC, Ridgefield, CT (US)

( * ) Notice: Subject to any disclaimer, the term of this patent is extended or adjusted under 35 U.S.C. 154(b) by 323 days.

(21) Appl. No.: 14/017,909

(22) Filed: Sep. 4, 2013

(65) Prior Publication Data

US 2015/0067104 A1 Mar. 5, 2015

(51) Int. Cl.
*H04L 29/08* (2006.01)
*H04L 29/06* (2006.01)

(52) U.S. Cl.
CPC ...... *H04L 63/0209* (2013.01); *H04L 63/0281* (2013.01)

(58) Field of Classification Search
USPC ......... 709/218; 726/2, 21, 36; 713/150, 163, 713/181; 380/255, 264, 276
See application file for complete search history.

(56) References Cited

U.S. PATENT DOCUMENTS

| 5,703,562 | A | 12/1997 | Nilsen |
| 7,260,833 | B1* | 8/2007 | Schaeffer ................... 726/3 |
| 7,650,607 | B2 | 1/2010 | Resnick et al. |
| 7,779,119 | B2 | 8/2010 | Ginter et al. |
| 7,860,857 | B2 | 12/2010 | Kagan et al. |
| 8,139,581 | B1* | 3/2012 | Mraz et al. ................ 370/392 |
| 8,239,055 | B2 | 8/2012 | Grove et al. |
| 8,352,450 | B1 | 1/2013 | Mraz et al. |
| 8,364,300 | B2 | 1/2013 | Pouyez et al. |
| 2002/0067370 | A1 | 6/2002 | Forney et al. |
| 2005/0257204 | A1 | 11/2005 | Bryant et al. |
| 2006/0056285 | A1 | 3/2006 | Krajewski, III et al. |
| 2006/0106747 | A1* | 5/2006 | Bartfai et al. .................... 707/1 |
| 2007/0028215 | A1 | 2/2007 | Kamath et al. |
| 2008/0189637 | A1 | 8/2008 | Krajewski et al. |
| 2012/0209967 | A1* | 8/2012 | Gopalakrishnan ............ 709/219 |

* cited by examiner

*Primary Examiner* — Farid Homayounmehr
*Assistant Examiner* — Sharif E Ullah
(74) *Attorney, Agent, or Firm* — Economou Silfin LLP; John S. Economou

(57) ABSTRACT

A system for transmitting ArchestrA information from a first network in a first security domain to a second network in a second security domain. A first stand-alone server within the first security domain retrieves information via the first network from a first ArchestrA Galaxy and/or from a first historian in the first security domain and forwards the retrieved information to a send server coupled to the first network. The send server forwards the received information received to a receive server via a one-way data link. The receive server receives the information from the send server and forwards the received information to a second stand-alone server via the second network. The second stand-alone server receives the information from the receive server and forwards the information to a second ArchestrA Galaxy and/or to a second historian in the second security domain.

20 Claims, 5 Drawing Sheets

SECURE ONE-WAY INTERFACE FOR ARCHESTRA DATA TRANSFER

FIELD OF INVENTION

This invention relates generally to a secure one-way data interface for transferring ArchestrA® data from a first network in a first security network domain to a second network in a second security network domain.

BACKGROUND OF THE INVENTION

Manufacturing processes and associated industrial process control systems produce a large amount of process information, and software applications are available that provide access in real-time to such information. One such software package is the Invensys Wonderware ArchestrA® software which acquires, stores (internally and in conjunction with the Invensys Wonderware Historian), and processes large amounts of process information in real time, typically operating on a process control network. In many situations, however, the process control network is located within a secure area, while client applications run on computers coupled to a separate corporate business network that are (or should be) isolated from that secure area. Coupling the separate corporate business network directly to the process control network, without security precautions, can lead to significant security issues, and even a firewall used to couple the two networks can be compromised. The Invensys Wonderware ArchestrA software and/or the Invensys Wonderware Historian may be separately installed on the corporate network, with data copied from the process control network to the corporate network. However, the process of copying such data can also lead to significant security issues, by either compromise of the firewall (when a direct connection is used) or by introduction of media into devices coupled to the process control network and the consequent risk that such media may include malware.

Alternative network security methods and devices based on unidirectional data transfer have been devised to address the network security concern. For example, U.S. Pat. No. 5,703,562 to Nilsen ("the '562 patent"), the contents of which are hereby incorporated by reference in its entirety, provides an alternative way to address the network security concern. The '562 patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

Any data link that strictly enforces the unidirectionality of data flow is called a one-way link or one-way data link. In other words, it is physically impossible to send information or data of any kind through a one-way data link in the reverse direction. A one-way data link may be hardware-based, software-based, or based on some combination of hardware and software.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms 101 and 102 (respectively, "the send platform" and "the receive platform") are connected to the unsecured external network 104 ("the source network") and the secure network 105 ("the destination network"), respectively. The send platform 101 is connected to the receive platform 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the send platform and to an optical receiver on the receive platform.

A configuration such as the one shown in FIG. 1 physically enforces one-way data transfer at both ends of the optical fiber connecting the send platform 101 to the receive platform 102, thereby creating a truly unidirectional data transfer link between the source network 104 and the destination network 105. One-way data transfer systems based on a one-way data link are designed to transfer data or information in only one direction, making it physically impossible to transfer any kind of data, such as handshaking protocols, error messages, or busy signals, in the reverse direction. Such physically imposed unidirectionality in data flow cannot be hacked by a programmer, as is often done with firewalls, where unidirectional rules are software-protected (e.g., password authentication, etc.). Accordingly, the one-way data transfer system based on a one-way data link ensures that data residing on the isolated destination secure computer or network is maximally protected from any undesired and unauthorized disclosure. Alternatively, the source network is isolated from any malware contained in the destination network.

As described in U.S. Pat. No. 8,352,450, issued on Jan. 8, 2013, the contents of which are incorporated herein by reference, files or data packets based on various conventional transport protocols may be transferred across a one-way data link under suitable arrangements. For example, files or data packets may be transferred across a one-way link based on the Transmission Control Protocol (TCP). FIG. 2 is a functional block diagram that schematically illustrates implementation of a TCP-based secure file (or data packet) transfer across a single one-way data link in a one-way data transfer system 200.

Construction of the conventional TCP sockets requires bilateral communications since it requires an acknowledgement channel from the receive node to the send node. Accordingly, the conventional TCP/IP protocol cannot be implemented directly in a one-way data transfer system based on a one-way data link, since no bilateral "hand shaking" is allowed over the one-way link due to physical enforcement of unidirectionality of data flow. Instead, the one-way data transfer system 200 illustrated in FIG. 2 uses a TCP simulation application called TCP proxy, which is preferably a TCP/IP socket-based proxy software, but may also be hardware-based or based on a suitable combination of software and hardware, to simulate the TCP/IP protocol across the one-way data link 207.

In FIG. 2, a TCP server proxy 205 fully implements the TCP/IP protocol in its bilateral communications 203 with the upstream TCP file client 202 residing in a source platform 201. The TCP server proxy 205 may reside within the send node 204 as shown in FIG. 2, or alternatively, may be separate from but coupled to the send node 204. After the TCP server proxy 205 receives files or data packets from the TCP file client 202, the send node 204 sends the files or data packets through its interface 206 to the one-way data link 207. After the receive node 208 receives the files or data packets through its interface 209 from the one-way data link 207, the TCP client proxy 210 communicates under the full implementation of the TCP/IP protocol with a TCP file server 213 residing in a destination platform 212 and forwards the received files or data packets to the TCP file server 213. The TCP client proxy 210 may reside within the receive node 208 as shown in FIG. 2, or alternatively, may be separate from but coupled to the receive node 208.

In certain situations, it would be advantageous to use a one-way data link with an independent link layer protocol for one-way transfer so that non-routable point to point communications with a true IP protocol break can be enforced. With these properties, data packets or files cannot be accidentally routed in the network and other protocols (such as printer protocols, etc.) will not route across the one-way data link. An exemplary configuration enforcing such non-routable point to point communications with a true IP protocol break can be implemented in the one-way file transfer system 200 of FIG. 2. The TCP-based file transfer system 200 may be configured to prohibit transmission of IP information across the one-way data link 207. When the TCP server proxy 205 receives a file from the TCP file client 202, it removes the IP information normally carried in the file data packet headers under the TCP/IP protocol and replaces it with pre-assigned point-to-point channel numbers, so that no IP information is sent across the one-way data link 207. Instead, predetermined IP routes may be defined at the time of the configuration of the system 200 in the form of channel mapping tables residing in the TCP server proxy 205 associated with the send node 204 and the TCP client proxy 210 associated with the receive node 208. The send node 204 then sends the files or data packets with the pre-assigned channel numbers to the receive node 208 through its interface 206 across the one-way data link 207, which are received by the receive node 208 through its interface 209. Upon receipt of the files or data packets, the TCP client proxy 210 then maps the channel numbers from the received files or data packets to the corresponding predetermined IP address of a destination platform 212, to which the files or data packets are forwarded.

It is an object of the present invention to provide a one-way interface between a secure network and a non-secure network for the secure transfer of ArchestrA data and/or associated Historian data from the secure network to the non-secure network.

SUMMARY OF THE INVENTION

In one embodiment, the present invention provides a system for transmitting ArchestrA information from a first network in a first security domain to a second network in a second security domain. A send server has an input coupled to the first network and an output, and is configured to forward information received via the input on the output. A one-way data link has an input coupled to the output of the send server and an output. A receive server has an input coupled to the output of the one-way data link and an output coupled to the second network. A first stand-alone server within the first security domain is coupled to the first network and is configured to retrieve information via the first network from a first ArchestrA Galaxy in the first security domain and/or from a first historian in the first security domain and to forward the retrieved information to the send server via the first network. A second stand-alone server within the second security domain is coupled to the second network. The receive server is configured to receive the information from the send server via the one-way data link and to forward the received information to the second stand-alone server via the second network. The second stand-alone server is configured to receive the information from the receive server and forward the information to a second ArchestrA Galaxy in the second security domain and/or to a second historian in the second security domain.

In another embodiment, the present invention provides a system for transmitting ArchestrA information from a first network in a first security domain to a second network in a second security domain. A first server has an input coupled to the first network and an output, and is configured to retrieve information via the first network from a first ArchestrA Galaxy in the first security domain and/or from a first historian in the first security domain and to forward the retrieved information on the output. A one-way data link has an input coupled to the output of the first server and an output. A second server has an input coupled to the output of the one-way data link and an output coupled to the second network, and is configured to receive the information from the first server via the one-way data link and to forward the received information to a second ArchestrA Galaxy in the second security domain and/or to a second historian in the second security domain.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

In the present disclosure, like reference numbers refer to like elements throughout the drawings, which illustrate various exemplary embodiments of the present invention.

The Invensys Wonderware ArchestrA® system platform is a distributed architecture for supervisory control and manufacturing information system that, in operation, can produce a large amount of process data in real time. Typically, the ArchestrA system platform runs on one or more networked computers in a high secure domain and is coupled to process equipment via associated interfaces. The Invensys Wonderware Historian works in conjunction with the ArchestrA system and acquires the process data, compresses and stores the data, and responds to requests for plant data. The Historian typically runs on a separate computer coupled to the same process control network and also positioned within the highly secure domain.

Figure 3:
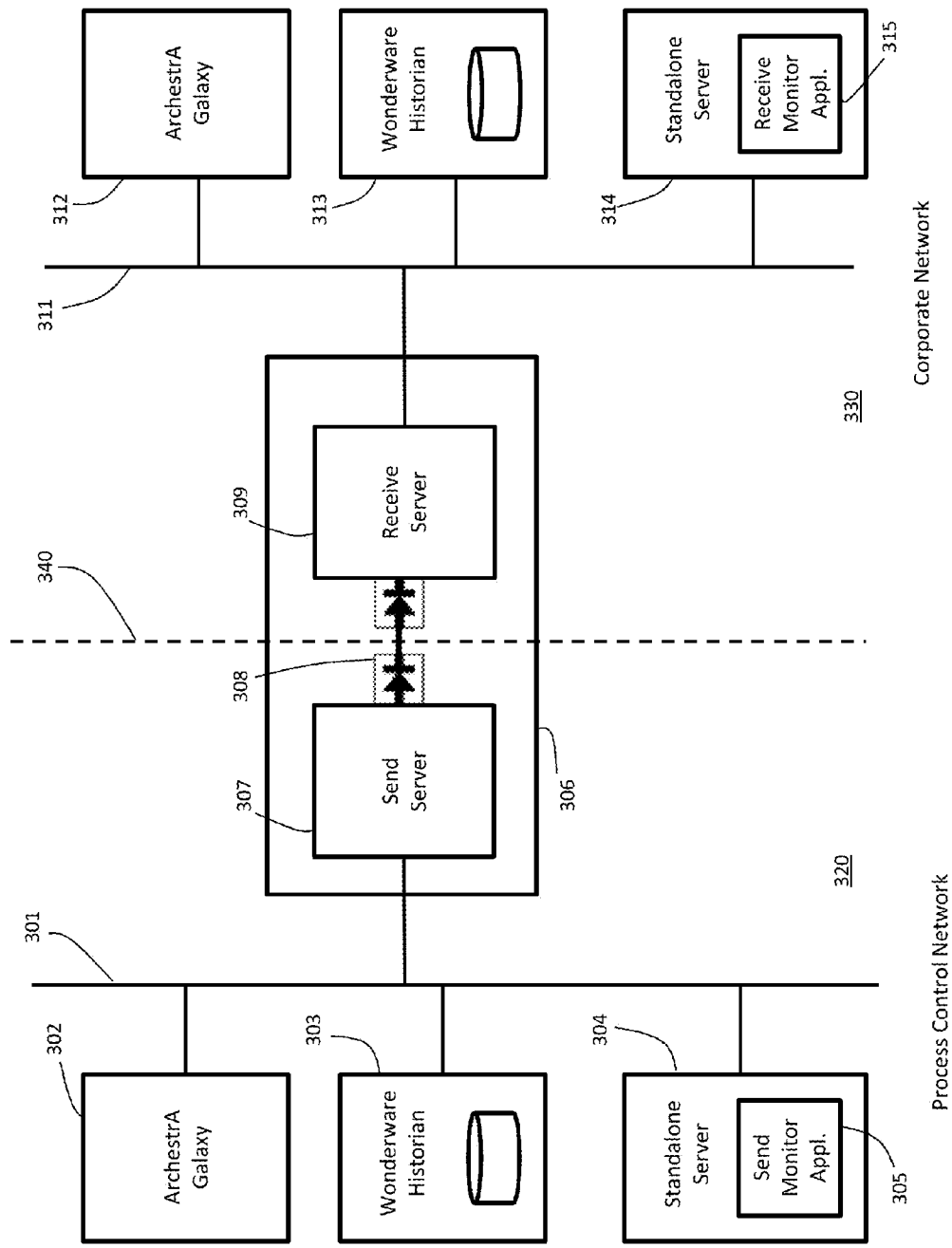
FIG. 3 is a block diagram of a data transfer system embodying features of one embodiment of the present invention.

Referring now to the drawings and in particular to FIG. 3, a first presently preferred embodiment is shown in which an ArchestrA Galaxy 302 and a Wonderware Historian 303 are coupled to a process control network 301. An ArchestrA Galaxy is a collection of one or more networked computers that may also be coupled, either via network 301 or via separate dedicated interfaces, to process equipment. The ArchestrA Galaxy 302 and the Wonderware Historian 303 are both included within a highly secure domain 320 (i.e., the area to the left of dotted line 340 in FIG. 3). In operation and as discussed above, the ArchestrA Galaxy 302 generates a great deal of process data, which the Wonderware Historian 303 collects and stores. The presently preferred embodiment also includes a standalone server 304 that is configured to run a send monitor application 305 (discussed below). Standalone server 304 is also coupled to the process control network 301.

A corporate network 311 is located within a less secure domain 330 (i.e., the area to the right of dotted line 340 in FIG. 3). A separate Wonderware Historian 313 and a separate ArchestrA Galaxy 312 are coupled to the corporate network 311. Preferably, a standalone server 314 is also coupled to the corporate network 311. Standalone server 314 is configured to run a receive monitor application 315 (also discussed below).

Figure 1:
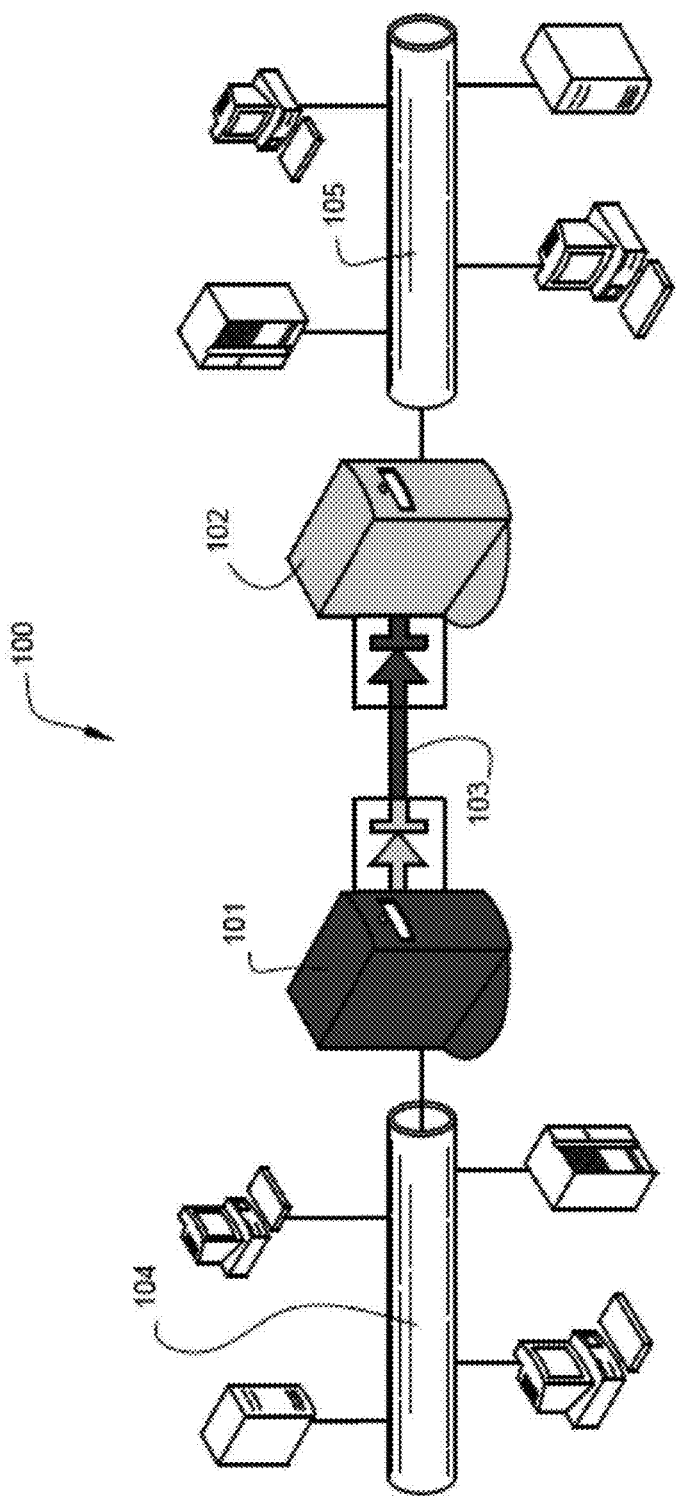
FIG. 1 schematically illustrates an example of a secure one-way data transfer system using a one-way data link.
Figure 2:
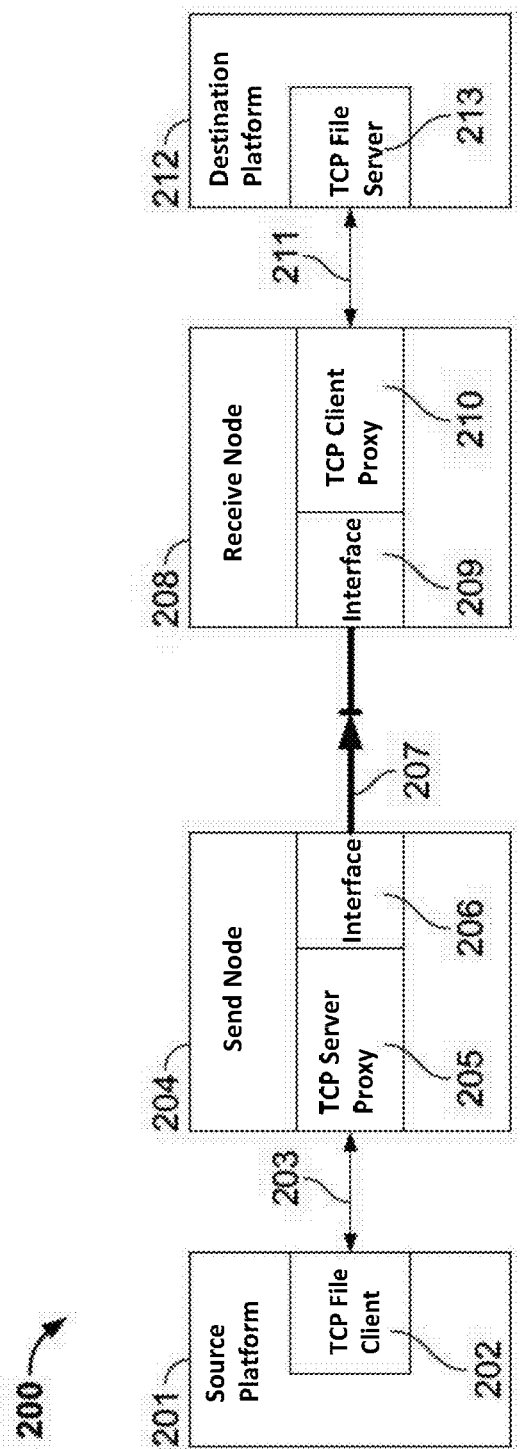
FIG. 2 is a functional block diagram that schematically illustrates TCP-based file or data packet transfer across a one-way data link.

As one of ordinary skill in the art will readily recognize, a direct two-way connection between process control network 301 and corporate network 311 can result in significant security risks. Therefore, a TCP-based one-way transfer system 306 is provided which includes an input coupled to process control network 301 and an output coupled to corporate network 311. In particular, one-way transfer system 306 includes a send server 307 coupled to the process control network 301 in the highly secure domain 320 via a network connection and which also is coupled to the input of one-way transfer device 308 (a one-way data link and preferably using a DualDiode device from Owl Computing Technologies, Inc.). A receive server 309 is coupled to an output of the one-way transfer device 308 and also has a network connection that is coupled to the corporate network 311 located within the less secure domain 330. One-way transfer system 306 works in a manner similar to the systems shown in FIGS. 1 and 2 in that information (e.g., data) can be transferred from the send server 307 to the receive server 309 but the physical structure of one-way transfer system 306 prevents any information whatsoever from being transferred from the receive server 309 to the send server 307. The send monitor application 305 and the receive monitor application 315 communicate over the respective associated networks using conventional communications protocols, e.g., TCP/IP.

The system disclosed in FIG. 3 relies upon two applications to move information across the one-way transfer system 306, including send monitor application 305 and receive monitor application 315. In overview, the send monitor application 305 is configured to read the ArchestrA values from ArchestrA Galaxy 302 (and/or from Wonderware Historian 303) and forward them to the one-way transfer system 306 while the receive monitor application 315 is configured to receive the ArchestrA values from the one-way transfer system 306 and write them to ArchestrA Galaxy 312 (and/or to Wonderware Historian 313).

The send monitor application 305 and the receive monitor application 315 programs are preferably constructed using the Invensys ArchestrA GRAccess toolkit, the ArchestrA MXAccess toolkit, and the ArchestrA InSQL toolkit. The ArchestrA GRAccess toolkit provides a series of routines and applications that interface with the ArchestrA Galaxy (such as ArchestrA Galaxy 302 in FIG. 3) and provide a user with the ability to select ArchestrA point attributes for data transmission. The ArchestrA MXAccess toolkit is used to do the actual data collection and data write for selected Archestra Point Parameters. The ArchestrA InSQL toolkit provides a series of routines and applications that facilitate the interface with the Invensys InSQL historian (e.g., the Wonderware Historian 303 in FIG. 3).

The send monitor application 305 reads live Archestra point attribute values data and InSQL data records from the secure plant environment (i.e., the ArchestrA Galaxy 302 and Wonderware Historian 303 coupled to process control network 301) and transmits those records to the one-way transfer system 306. The receive monitor application 315 receives the point attribute values data and InSQL data records from the one-way transfer system 306 and writes the records to the ArchestrA Galaxy 312 or Wonderware Historian 313 located in the corporate plant environment 330.

The send monitor application 305 and receive monitor application 315 each preferably operate on a Windows platform such as the corresponding standalone servers 304, 314 in FIG. 3. Each standalone server 304, 314 must be a recognized member of the associated ArchestrA Galaxy 302, 312 and the Archestra platform must be deployed to each standalone server 304, 314.

Figure 4:
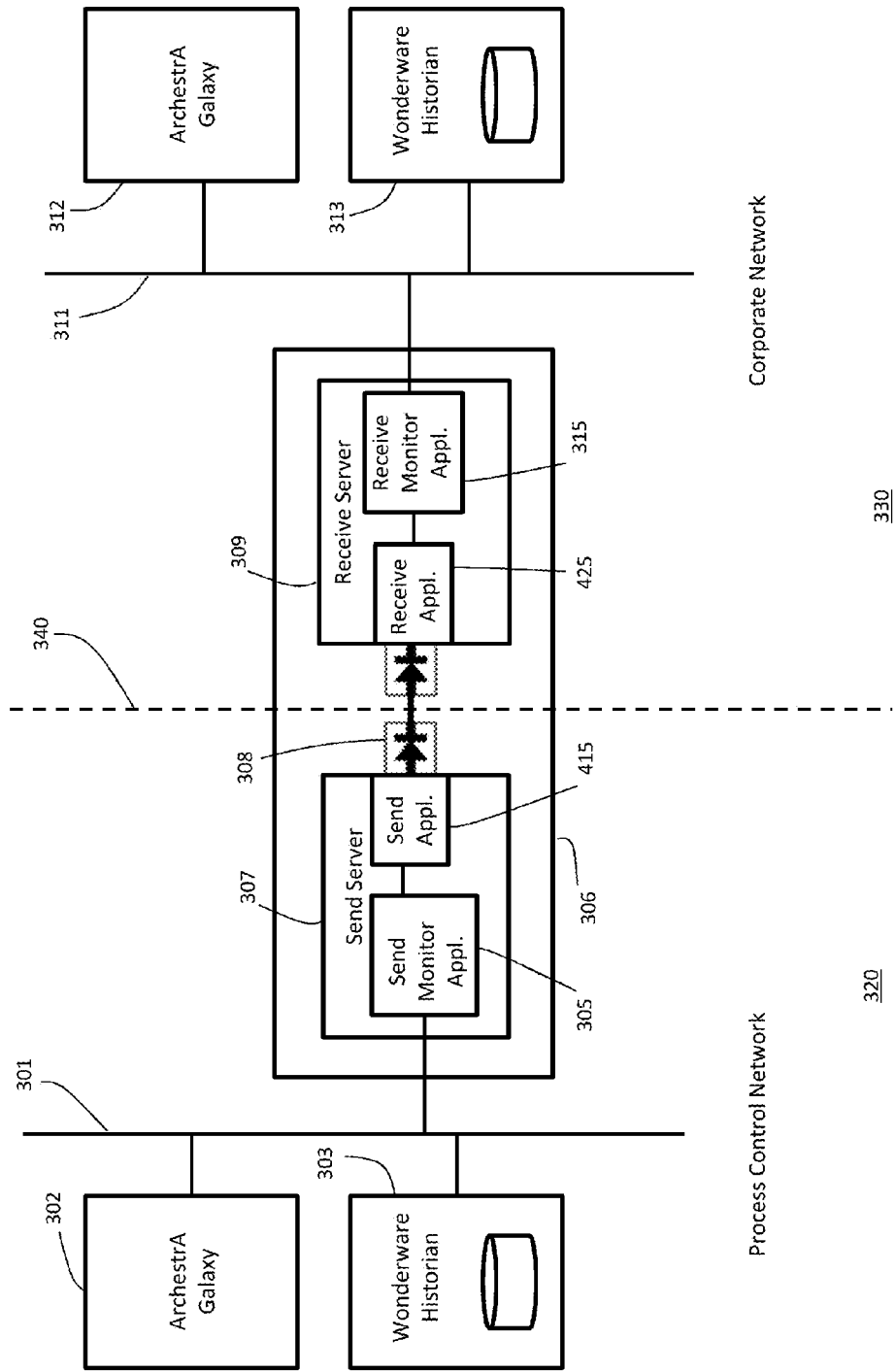
FIG. 4 is a block diagram of a data transfer system embodying features of another embodiment of the present invention.

Referring now to FIG. 4, in an alternative embodiment, the standalone servers 304, 314 of the FIG. 3 embodiment are omitted. Send server 307 is configured to run both the send monitor application 305 and a separate send application 415. Likewise, receive server 309 is configured to run both a receive application 425 and the receive monitor application 315. In this embodiment, the send server 307 and the receive server 309 must be a recognized member of the associated ArchestrA Galaxy 302, 312 and the Archestra platform must be deployed to each server 307, 309. Although this embodiment omits a standalone server in both the process control network and the corporate network, compatibility with ArchestrA requires that send server 307 and receive server 307 both be configured to operate under Microsoft Windows®. In all other respects, the embodiment of FIG. 4 operates identically to the embodiment of FIG. 3, as discussed below.

The send monitor application 305 is preferably a Microsoft Windows® application that is configured to collect live point values and InSQL historical data records from the ArchestrA system located in the secure plant environment 320. The point data and historical records are then passed across the one-way transfer system 306, and moved into an ArchestrA system located in the corporate network 330. Live data transmission is enabled by selecting Archestra Point Parameters from the Galaxy. If no points are selected, then no point attribute values are transmitted. A graphical interface is preferably used to facilitates the selection of ArchestrA Point Parameters. The entire galaxy and all point attributes are exposed, and the user can select any valid parameter for collection and transmission. Parameter values can be added and deleted without interrupting the collection and transmission process being performed by send monitor application 305.

The send monitor application 305 uses ArchestrA MXAccess toolkit to retrieve values from the ArchestrA system. The MXAccess toolkit is designed to work by exception, i.e., an application subscribes to receive point changes with the Archestra system, and receives notifications of data changes in the Galaxy. Data changes are immediately propagated across the one-way transfer system 306 as they occur. In addition, the current values for all points registered in the send monitor application 305, as well as the point and attribute names themselves, are transmitted across the one-way transfer system 306 at regular intervals. This is done to provide initialization data of all values and point attribute names for the receive monitor application 315.

The send monitor application 305 also reads InSQL records from an InSQL server within Wonderware Historian 303 and passes those records to the receive monitor application 315 (or receive monitor application 420) running on the corporate network (i.e., the less secure domain). The send monitor application 305 retrieves all of the InSQL archive records spanning a user-specified time range. The historical retrieval is continuously repeated, and all records are passed to the receive monitor application 315. There may be times when the InSQL server in Wonderware Historian 313 becomes unavailable for maintenance or some other reason. When the InSQL server in Wonderware Historian 313 becomes available again, it will be backfilled with historical data by send monitor application 305. A user may change the time span processed by send monitor application 305 dynamically without interfering with the archive collection process.

The receive monitor application 315 is preferably a Microsoft Windows® application that is configured to write live point data and InSQL data records received from the send monitor application 305 to Archestra Galaxy 312 located in the corporate plant environment 330. Live data reception is only enabled if the user has selected Archestra Point Parameters on at the send monitor application 305. Upon startup, the receive monitor application 315 waits for a list of point and attribute names from send monitor application 305. When send monitor application 305 has received a complete point list, send monitor application 305 registers those points for update in ArchestrA Galaxy 312 using the MXAccess toolkit. All current values are periodically transmitted from send monitor application 305, and these current values are used to establish the initial values in the ArchestrA Galaxy 312. Once initialization is established, new point values received from send monitor application 305 are written to the ArchestrA Galaxy 312. The receive monitor application 315 receives the historical records from the send monitor application 305 and examines each received record. The receive monitor application 315 preferably checks to see if a data record for that point at the stated time already exists in the InSQL historical archive in Wonderware Historian 313. The record is written to the InSQL historical archive only if it is found to not exist in in Wonderware Historian 313.

In overview, storing values into the Archestra Galaxy and associated Wonderware Historian requires a balance of minimal performance impact, efficiency, and speed. It is much quicker to retrieve records from the Wonderware Historian than it is to store those records. Therefore, the rate at which records are retrieved and sent from the send monitor application 305 must be adjusted to avoid overrunning the storage process performed by the receive monitor application 315. The send monitor application 305 collects InSQL historical records and transmits them across the one-way transfer system 306. The InSQL historical records are transmitted using the unique InSQL index number for each point. The send monitor application 305 must give the receive monitor application 315 a list of InSQL points and their associated InSQL index number and must repeat this action periodically because the receive monitor application 315 may fail and restart. A user defines a refresh time, in minutes, for the point list transfer and how much data to collect in terms of days, hours, and minutes. This is considered the span (i.e., the span is a user-defined portion of the entire InSQL database). The number of points defined in an InSQL database can be very large, in the order of tens of thousands. It may be impractical to read the archive records for all points in a given slice with a single transaction. Therefore, the span may preferably be subdivided into slices. The slice time, specified in minutes, is user-defined. A slice may still be too granular for historical record retrieval. Therefore, a slice may be divided into segments. A segment is defined as a number of points. The send monitor application 305 will then sequentially extract all historical records for the number of points defined in the segment for the given span. The user can also define a segment delay in seconds. The segment delay specifies a wait time between processing of each segment.

A user also has the option to interleave current archive records with the processing of the span. This increases the span processing time, but insures that the most recent archive records are available at receive monitor application 315. Therefore, if Wonderware Historian 313 were to fail and then restart, current value records would be available a short time thereafter. After a slice is processed, at receive monitor application 315 reads all new InSQL historical records that were generated during the time the slice was processed and transmits those records to the receive monitor application 315. The injected current value slice is processed in the same fashion as the archive slice. That is, the current value slice is divided into segments.

The amount of time needed to process a span can be quite large. There are a number of variables that affect the span processing time, including: (1) Duration of the span; (2) Number of Historical Points; (3) Storage rate per point; (4) Wonderware historian computer speed; and (5) Additional InSQL Query operations performed by other users. In one test with current value records are interleaved with InSQL historical records, the send monitor application 305 takes about 30% of a specified span time to process the complete span. For example, if the specified span is 6 hours, send monitor application 305 will complete the entire span in about 2 hours. If current value records are not interleaved, the send monitor application 305 takes about 20% of the specified span time to process the complete span.

The receive monitor application 315 receives InSQL historical data across the one-way transfer system 206 from send monitor application 305, and store those records in Wonderware Historian 313. The receive monitor application 315 actually performs two tasks. First, when InSQL historical records are received from the send monitor application 305, receive monitor application 315 must read from the Wonderware Historian 313 database to determine if such records already exist. Second, if such records do not exist, receive monitor application 315 must store those records the Wonderware Historian 313. This added requirement is why the speed of the record transmissions from the send monitor application 305 must be throttled. When the receive monitor application 315 starts, it waits until it has received a complete point list from the send monitor application 305. All archive records from the send monitor application 305 use the InSQL index number. However, the InSQL index number for a given point on the send monitor application 305 will probably not match the InSQL index number on the receive monitor application 315 for the same point. Therefore, the receive monitor application 315 is configured to generate a cross reference table of the send monitor application 305 index numbers to the receive monitor application 315 index numbers.

Figure 5:
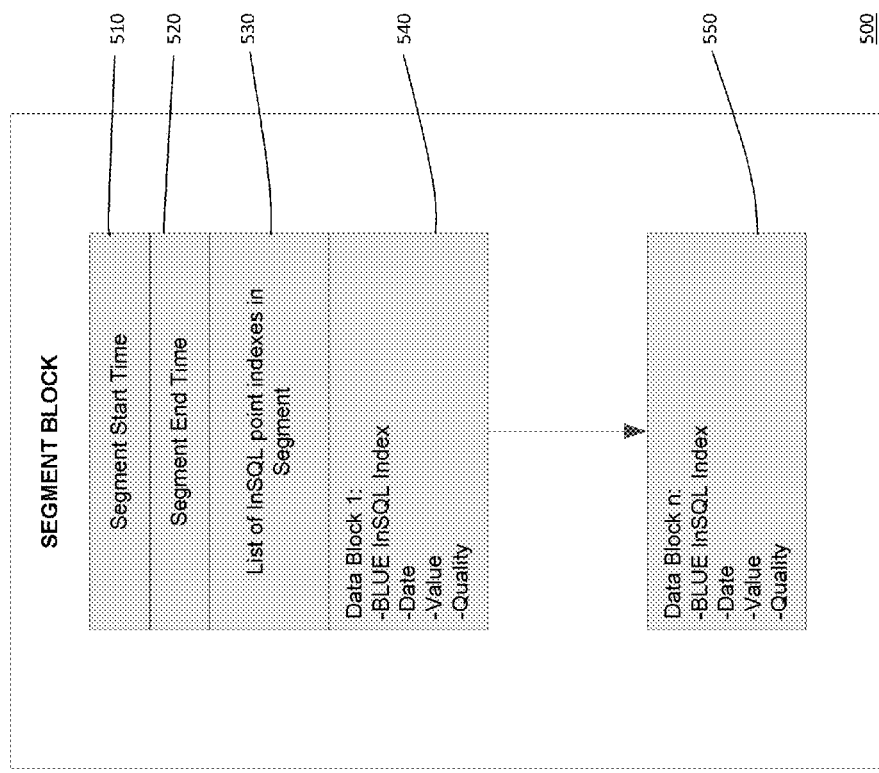
FIG. 5 is a diagram of the contents of a segment transferred according to an embodiment of the present invention.

The receive monitor application 315 receives archive records as a segment as shown in FIG. 5. Each segment block 500 includes a segment start time 510, a segment end time 520, a list 530 of InSQL point indexes in the current segment and data blocks 540, 550. Each data block 540, 550 may include the current InSQL index value for the process control network side (BLUE), and information pertaining to date, value and quality. The receive monitor application 315 tracks the time spans received for each point. When it receives a segment, it looks to see if it has already received values for the points and times specified in the segment block. If it has previously received the data at the time specified for this segment, it does not need to process the data in the segment. If the receive monitor application 315 has not processed data in this time span, it must query the Wonderware Historian 313 database for all of the points listed in the segment block for the time span specified in the segment block. Receive monitor application 315 will then compare the incoming data blocks with the results of the query to determine which records need to be stored. Once the block is processed, receive monitor application 315 will remember that the values for this time span have already been processed. The Wonderware Historian 313 database does a very good job at historizing current values, however, its ability to process older archive records is limited. The technique generally used is called Fastlist. Fastlist processing consists of writing a file containing archive data to a specific directory on the InSQL machine (i.e., Wonderware Historian 313). The InSQL database on Wonderware Historian 313 monitors this directory for new files. When a new file is present, it will process the data in that file quite quickly, and make those records available in history. However, each time InSQL processes a Fastlist, it creates a separate database segment. As the number of database segments increases, the query time increases. If there are a large number of database segments, query performance can be 10 or 20 times slower. Therefore, it is important to limit the number of Fastlist files sent to the InSQL server in Wonderware Historian 313. The user defines the frequency at which Fastlist files are created. if, for example, the Fastlist frequency is defined as 15 minutes, receive monitor application 315 will accumulate all values during a 15 minute period. at the expiration of the period, receive monitor application 315 will write all of its accumulated values to the InSQL server in Wonderware Historian 313.

As evident, the foregoing embodiments provide a highly secure one-way interface for transferring ArchestrA data from a higher security network domain to a lower security network domain.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A system for transmitting ArchestrA information from a first network in a first security domain to a second network in a second security domain, comprising:
a send server computer within the first security domain having an input coupled to the first network and an output, the send server computer configured to forward information received via the input on the output;
a one-way data link having an input within the first security domain coupled to the output of the send server computer and an output within the second security domain;
a receive server computer within the second security domain having an input coupled to the output of the one-way data link and an output coupled to the second network;
a first stand-alone server computer within the first security domain coupled to the first network and configured to retrieve information via the first network from a first ArchestrA Galaxy in the first security domain and/or from a first historian in the first security domain and to forward the retrieved information to the send server computer via the first network;
a second stand-alone server computer within the second security domain coupled to the second network;
wherein the receive server computer is configured to receive the information from the send server computer via the one-way data link and to forward the received information to the second stand-alone server computer via the second network;
wherein the second stand-alone server computer is configured to receive the information from the receive server computer and forward the information to a second ArchestrA Galaxy in the second security domain and/or to a second historian in the second security domain; and
wherein the one-way data link is configured to transfer data only from the send server computer to the receive server computer and to prevent any signal from passing from the receive server computer to the send server computer, and wherein the receive server computer is coupled to the send server computer only via the one-way data link.

2. The system of claim 1, wherein the information retrieved by the first stand-alone server computer comprises live point values.

3. The system of claim 1, wherein the information retrieved by the first stand-alone server computer comprises InSQL historical data records.

4. The system of claim 1, wherein the information retrieved by the first stand-alone server computer comprises live point values and InSQL historical data records.

5. The system of claim 2, wherein the first stand-alone server computer is user-configured to set a list of point and attribute names, and wherein the first stand-alone server computer is configured to retrieve only the live point values associated within the list of point and attribute names.

6. The system of claim 3, wherein the first stand-alone server computer is user-configured to set a time range for the number of InSQL historical records to be retrieved, and wherein the first stand-alone server computer is configured to retrieve only the InSQL historical records within the set time range.

7. The system of claim 6, wherein the first stand-alone server computer is user-configured to set a sub-range for the number of InSQL historical records to be retrieved, and wherein the first stand-alone server computer is configured to sequentially retrieve and forward a sub-portion of the InSQL historical records corresponding to the set sub-range until all of the InSQL historical records corresponding to the set time range are retrieved and forwarded.

8. The system of claim 7, wherein the first stand-alone server computer is user-configured to set a delay time, and wherein each sequential retrieval and forwarding operation is followed by a delay corresponding to the set delay time.

9. The system of claim 4, wherein the first stand-alone server computer is user-configured to set a time range and a sub-range for the number of InSQL historical records to be retrieved, wherein the first stand-alone server computer is configured to sequentially retrieve and forward a sub-portion of the InSQL historical records corresponding to the set sub-range until all of the InSQL historical records corresponding to the set time range are retrieved and forwarded, and wherein the first stand-alone server computer is configured to interleave live point values with each sequential retrieval and forwarding operation for the InSQL historical records.

10. The system of claim 3, wherein the second stand-alone server computer is user configured compare an index of each received InSQL historical record with a list previously received InSQL historical records and to only forward the received InSQL historical records to the second historian that were not previously received.

11. A system for transmitting ArchestrA information from a first network in a first security domain to a second network in a second security domain, comprising:
 a first server computer within the first security domain having an input coupled to the first network and an output, the first server computer configured to retrieve information via the first network from a first ArchestrA Galaxy in the first security domain and/or from a first historian in the first security domain and to forward the retrieved information on the output;
 a one-way data link having an input within the first security domain coupled to the output of the first server computer and an output within the second security domain;
 a second server computer within the second security domain having an input coupled to the output of the one-way data link and an output coupled to the second network, the second server computer configured to receive the information from the first server computer via the one-way data link and to forward the received information to a second ArchestrA Galaxy in the second security domain and/or to a second historian in the second security domain; and
 wherein the one-way data link is configured to transfer data only from the first server computer to the second server computer and to prevent any signal from passing from the second server computer to the first server computer, and wherein the second server computer is coupled to the first server computer only via the one-way data link.

12. The system of claim 11, wherein the information retrieved by the first server computer comprises live point values.

13. The system of claim 11, wherein the information retrieved by the first server computer comprises InSQL historical data records.

14. The system of claim 11, wherein the information retrieved by the first server computer comprises live point values and InSQL historical data records.

15. The system of claim 12, wherein the first server computer is user-configured to set a list of point and attribute names, and wherein the first server computer is configured to retrieve only the live point values associated within the list of point and attribute names.

16. The system of claim 13, wherein the first server computer is user-configured to set a time range for the number of InSQL historical records to be retrieved, and wherein the first server computer is configured to retrieve only the InSQL historical records within the set time range.

17. The system of claim 16, wherein the first server computer is user-configured to set a sub-range for the number of InSQL historical records to be retrieved, and wherein the first server computer is configured to sequentially retrieve and forward a sub-portion of the InSQL historical records corresponding to the set sub-range until all of the InSQL historical records corresponding to the set time range are retrieved and forwarded.

18. The system of claim 17, wherein the first server computer is user-configured to set a delay time, and wherein each sequential retrieval and forwarding operation is followed by a delay corresponding to the set delay time.

19. The system of claim 14, wherein the first server computer is user-configured to set a time range and a sub-range for the number of InSQL historical records to be retrieved, wherein the first server computer is configured to sequentially retrieve and forward a sub-portion of the InSQL historical records corresponding to the set sub-range until all of the InSQL historical records corresponding to the set time range are retrieved and forwarded, and wherein the first server computer is configured to interleave live point values with each sequential retrieval and forwarding operation for the InSQL historical records.

20. The system of claim 13, wherein the second server computer is user configured compare an index of each received InSQL historical record with a list previously received InSQL historical records and to only forward the received InSQL historical records to the second historian that were not previously received.

* * * * *